United States Patent
Jacobs et al.

(10) Patent No.: US 8,621,721 B2
(45) Date of Patent: Jan. 7, 2014

(54) DEVICE ON A SPINNING ROOM PREPARATION MACHINE, FOR EXAMPLE A FIBRE FLOCK FEEDER, CARDING MACHINE, CLEANER OR THE LIKE, FOR SUPPLYING AND/OR DISCHARGING FIBRE MATERIAL

(75) Inventors: Britta Jacobs, Straelen (DE); Eike Tammen, Moenchengladbach (DE)

(73) Assignee: Fa. Truetzschler GmbH & Co. Kg, Moenchengladbach (DE)

( * ) Notice: Subject to any disclaimer, the term of this patent is extended or adjusted under 35 U.S.C. 154(b) by 0 days.

(21) Appl. No.: 13/427,948

(22) Filed: Mar. 23, 2012

(65) Prior Publication Data
US 2012/0305622 A1 Dec. 6, 2012

(30) Foreign Application Priority Data
Jun. 1, 2011 (DE) .......................... 10 2011 103 840

(51) Int. Cl.
*D01G 15/40* (2006.01)

(52) U.S. Cl.
USPC .......................................................... 19/105

(58) Field of Classification Search
USPC .......................................................... 19/105
See application file for complete search history.

(56) References Cited

U.S. PATENT DOCUMENTS

| | | | |
|---|---|---|---|
| 3,991,442 A * | 11/1976 | Miroshnichenko et al. ...... | 19/53 |
| 4,272,867 A * | 6/1981 | Schopper .................... | 19/159 R |
| 4,528,723 A * | 7/1985 | Hergeth et al. ................. | 19/105 |
| 4,637,104 A * | 1/1987 | Mente ............................. | 28/283 |
| 4,931,005 A * | 6/1990 | Tanaka et al. ................ | 425/83.1 |
| 4,970,759 A * | 11/1990 | Roberson ........................ | 19/105 |
| 5,245,728 A * | 9/1993 | Rupp et al. ..................... | 19/148 |
| 5,257,831 A * | 11/1993 | Garcia ............................ | 241/42 |
| 5,297,316 A * | 3/1994 | Bernhardt et al. .............. | 19/105 |
| 5,752,294 A * | 5/1998 | Mor .............................. | 19/66 CC |
| 5,913,393 A * | 6/1999 | Shaltry et al. .................. | 19/97.5 |
| 6,118,082 A * | 9/2000 | Bissette ........................ | 177/116 |
| 6,263,545 B1 * | 7/2001 | Pinto .............................. | 19/97.5 |
| 6,276,028 B1 * | 8/2001 | Pinto .............................. | 19/105 |
| 6,421,884 B2 * | 7/2002 | Pinto .............................. | 19/105 |
| 6,460,223 B1 * | 10/2002 | Pinto .............................. | 19/105 |
| 6,557,214 B2 * | 5/2003 | Pinto .............................. | 19/105 |
| H2105 H * | 6/2004 | Pinto .............................. | 19/105 |
| 7,267,415 B2 * | 9/2007 | Saruta ............................. | 347/7 |
| 7,325,277 B2 * | 2/2008 | Pinto .............................. | 19/105 |
| 2001/0014994 A1 * | 8/2001 | Pinto .............................. | 19/105 |
| 2002/0004970 A1 * | 1/2002 | Pinto .............................. | 19/105 |
| 2002/0116792 A1 * | 8/2002 | Pinto .............................. | 19/105 |
| 2004/0255429 A1 * | 12/2004 | Clausen ........................ | 19/97.5 |
| 2006/0010654 A1 * | 1/2006 | Buhl et al. .................. | 19/145.3 |

(Continued)

FOREIGN PATENT DOCUMENTS

DE 29 40 244 A 5/1980

*Primary Examiner* — Shaun R Hurley
(74) *Attorney, Agent, or Firm* — Venable LLP; Robert Kinberg; Steven J. Schwarz

(57) ABSTRACT

In a device on a spinning room preparation machine, for example a fiber flock feeder, carding machine, cleaner or the like, for supplying and/or discharging fiber material, a tray-like guide element having a guide surface co-operates with at least one conveyor roll located opposite, the fiber material being guided towards and along the guide surface. In order to provide a simple way of supplying and/or discharging fiber material without undesirable adhesion of fibers, the guide element located opposite the at least one conveyor roll is arranged to be set in vibration by at least one actuator.

19 Claims, 3 Drawing Sheets

(56) References Cited

U.S. PATENT DOCUMENTS

| | | | |
|---|---|---|---|
| 2006/0016049 A1* | 1/2006 | Schlichter et al. | 19/98 |
| 2006/0225252 A1* | 10/2006 | Shindo et al. | 19/0.6 |
| 2007/0124894 A1* | 6/2007 | Drapela et al. | 19/296 |
| 2007/0163087 A1* | 7/2007 | Pinto | 19/105 |
| 2009/0064464 A1* | 3/2009 | Leger | 19/236 |

* cited by examiner

DEVICE ON A SPINNING ROOM PREPARATION MACHINE, FOR EXAMPLE A FIBRE FLOCK FEEDER, CARDING MACHINE, CLEANER OR THE LIKE, FOR SUPPLYING AND/OR DISCHARGING FIBRE MATERIAL

CROSS-REFERENCE TO RELATED APPLICATION

The present application claims priority from German Patent Application No. 10 2011 103 840.3 dated Jun. 1, 2011, the disclosure of which is incorporated herein by reference.

BACKGROUND OF THE INVENTION

The invention relates to a device on a spinning room preparation machine, for example a fibre flock feeder, carding machine, cleaner or the like, for supplying and/or discharging fibre material, in which a tray-like guide element having a guide surface co-operates with at least one conveyor roll located opposite, the fibre material being guided towards and along the guide surface.

At the feed tray of the flock feeder of a carding machine it can happen that fibres remain adhering to the tray as a result of high surface roughness. This has the result that a "sausage" of fibres forms at that location and the machine becomes blocked. In order to avoid that kind of blockage, nowadays the trays are laboriously polished.

In a device for filling spinning cans with the fibre strand (sliver) (DE 29 40 244 A), a fibre strand from a draw frame or carding machine is guided over a ramp that has been set in vibration in order to ensure that the fibre strand slides smoothly. At the same time, as filling of the can progresses, the support is slowly lowered from an upper position to a waiting position. As a result, the pressure of the fibre strand on a rapidly rotating funnel wheel is constant. In that way, a shaking movement brings about compaction of the fibre strand.

It is an aim of the invention to provide a device of the kind described at the beginning which avoids or mitigates the mentioned disadvantages and which, in particular, provides a simple way of supplying and/or discharging the fibre material without undesirable adhesion of fibres.

SUMMARY OF THE INVENTION

The invention provides a device on a spinning room preparation machine for supplying and/or discharging fibre material, having
a guide element having a guide surface; and
at least one conveyor roll located opposite and co-operating with the guide surface, the fibre material in use being guided towards and along the guide surface;
wherein the device further comprises an actuator for causing vibration of said guide element.

By the introduction of vibration into the guide element, for example the tray, the friction between the fibres and guide element is advantageously reduced in such a way that nothing remains adhering. That applies both to the fibre material (fibre flocks, fibre web) and to any conditioning agent present. Such conditioning agents (preparations) have in many cases a certain tendency to stick. A particular advantage is that even when the fibre material exerts pressure on or acts on the guide surface—brought about by the at least one rotating conveyor roll—undesirable accumulations on the guide surface are effectively avoided.

The invention also provides a device on a spinning room preparation machine, for example a fibre flock feeder, carding machine, cleaner or the like, for supplying and/or discharging fibre material, in which a tray-like guide element having a guide surface co-operates with at least one conveyor roll located opposite, the fibre material being guided towards and along the guide surface, wherein the guide element located opposite the at least one conveyor roll is arranged to be set in vibration by at least one actuator.

Advantageously, the vibrations enable the frictional resistance between the fibre material and the guide surface to be reduced. The vibrations advantageously enable the fibre material to slide smoothly along the guide surface.

Advantageously, a guide element of the device is provided with a device for generating vibrations. By way of example, only, the vibration-generating device may be a piezo actuator, for example a stack actuator or a ring actuator; an eccentric device; or a shaking device.

The arrangement is preferably such that the oscillatory behaviour of the guide surface is adjustable.

In some embodiments the guide element is arranged to be set in vibration by a mechanical device. In other illustrative embodiments, the guide element is arranged to be set in vibration by an electrical device.

In yet further embodiments, the guide element is arranged to be set in vibration by an electromechanical device, or by electromagnetic means.

The guide element may in accordance with the invention be in any spinning room machine in which a tray-like guide element co-operates with a slowly rotating intake or feed roll, for example opener machines or cleaning machines in spinning room preparation or the intake device upstream of the opening roll of an OE spinning machine. For example, the guide element may be provided on a fibre flock feeder. In another illustrative example the guide element is an intake tray opposite an intake roll. In a further embodiment, the guide element is an intake tray upstream of an opener roll. In other embodiments, the guide element may be a feed tray opposite a feed roll at the inlet of a carding machine. In yet other embodiments, the guide element is provided for taking off and condensing a fibre web at the outlet of a carding machine. Advantageously, the guide element is provided on a fibre opening machine or cleaning machine.

BRIEF DESCRIPTION OF THE DRAWINGS

FIG. 2b is an enlarged view of a detail of the embodiment shown in FIG. 2a;

DETAILED DESCRIPTION OF INVENTION

Figures 1, 2A:
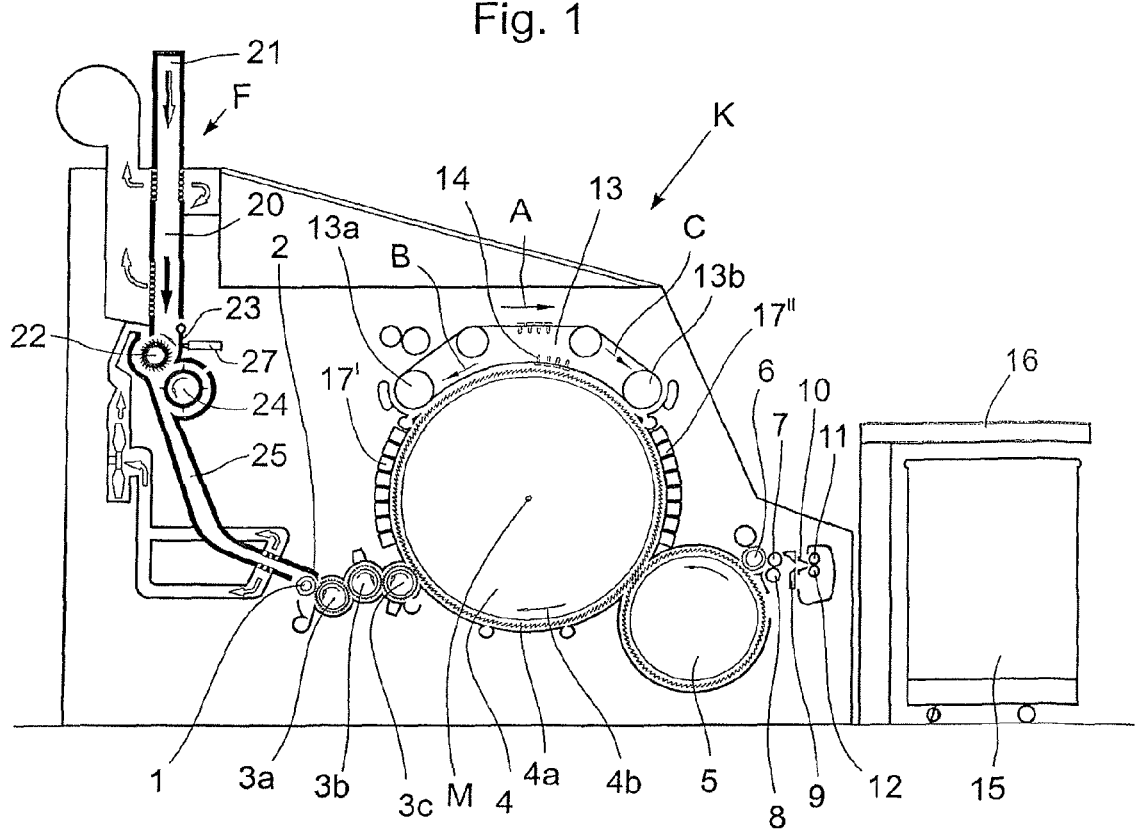
FIG. 1 is a diagrammatic side view of a carding machine having a flock feeder with a first embodiment of the device according to the invention.
FIG. 2a is a side view of a feed tray and feed roll and an opening roll of the flock feeder in accordance with FIG. 1 with the first embodiment of the device according to the invention at the feed tray with a stack actuator.

With reference to FIG. 1, a carding machine, for example a flat card TC made by Trützschler GmbH & Co. KG of Monchengladbach, Germany, has a feed roll 1, feed table 2, lickers—in 3a, 3b, 3c, cylinder 4, doffer 5, stripper roll 6, nip rolls 7, 8, web guide element 9, web funnel 10, delivery rolls 11, 12, revolving flat top 13 with flat guide rollers 13a, 13b and flat bars 14, can 15 and coiler 16. The directions of rotation of the rolls are indicated by curved arrows. Reference letter M denotes the centre point (axis) of the cylinder 4. Reference numeral 4a denotes the clothing and reference numeral 4b denotes the direction of rotation of the cylinder 4. Reference letter B denotes the direction of rotation of the revolving flat top 13 in the carding position and reference letter C denotes the return transport direction of the flat bars 14, with reference numerals 17', 17" denoting functional elements and reference numerals 13a and 13b denoting flat guide rollers. The arrow A denotes the working direction.

A flock feeder F, for example a DIRECTFEED (trademark) feeder made by Trutzschler GmbH & Co. KG, is an integral part of the flat card TC. The flock feeder F has a vertical reserve shaft 20 to which finely opened fibre material is fed from above. The fibre material may be fed, for example, by way of a condenser through a feed and distribution line 21. The upper region of the reserve shaft 20 is provided with air-outlet openings through which the transporting air emerges after separation of the fibre flocks and enters an extraction device. The lower end of the reserve shaft 20 is closed by an intake roll 22 which co-operates with an intake tray 23. The intake roll 22 supplies the fibre material from the reserve shaft 20 to a high-speed opener roll 24, located below the reserve shaft, which is provided with pins or sawtooth wire and is in communication over part of its circumference with a lower feed shaft 25. The opener roll 24 rotating in the direction of the arrow conveys the fibre material it collects to the feed shaft 25. The feed shaft 25 has at its lower end a delivery roll which rotates as indicated by the arrow in the drawing and supplies the fibre material to the flat card K. The intake roll 23 rotates slowly in the clockwise direction (arrow 22a) and the roll 24 rotates in the anti-clockwise direction (arrow 24a), so that the rolls rotate in opposite directions (see FIG. 2a).

Various actuators can be used for generating vibration, for example motors with imbalance or piezo actuators. Illustrative examples of piezo actuators that maybe used include, for example, a stack actuator (FIG. 2b) or a ring actuator (FIG. 3a, 3b).

Figure 2B:
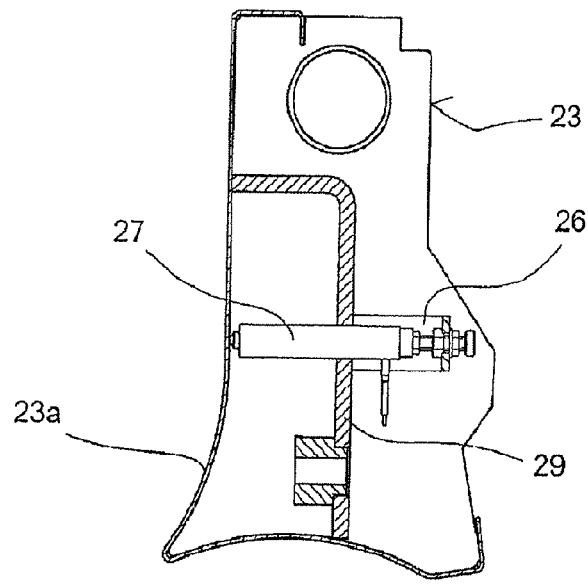

In the arrangement of FIGS. 2a & 2b there is used a piezo actuator. With reference to FIG. 2b, the piezo actuator 27 is screwed onto the angled portion 29 of the feed tray 23 by means of a sheet metal bracket 26, guided through a bore in that angled portion 29 and then brought to abut against the sheet metal tray element 23a. The end face of the piezo actuator 27 is in contact with the surface of the sheet metal tray element 23a remote from the intake roller 22. The piezo actuator 27 can be a stack actuator having a displacement path of 45 µm. When an electronic voltage is applied to the actuator 27, the actuator expands and exerts pressure on the sheet metal tray element 23a. In the voltage-free state, the actuator contracts again. That cycle is repeated rapidly in succession in order to generate vibration. A frequency of, for example, between 10 and 2000 Hz is possible.

Figure 3A:
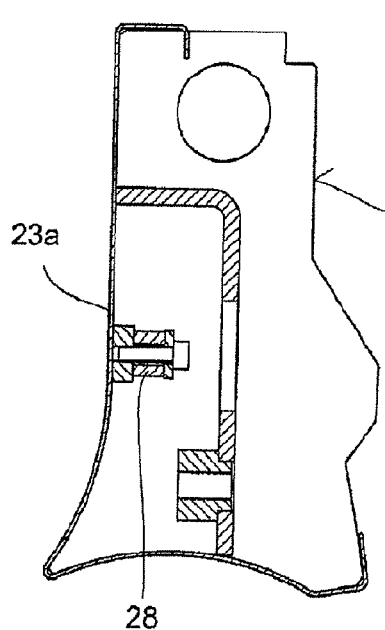
FIG. 3a, 3b show a further embodiment of the device according to the invention at a feed tray with a ring actuator.
Figure 3B:
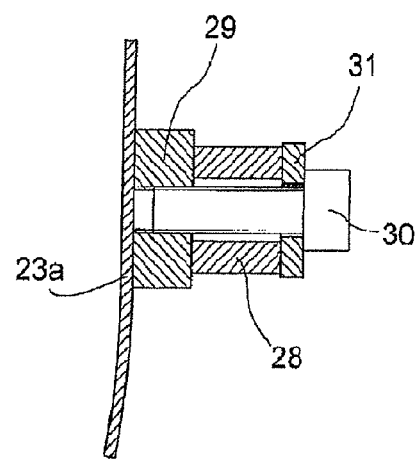

In the exemplary embodiment of FIG. 3a, 3b, a ring piezo actuator 28 is assigned to the sheet metal tray element 23a of the feed tray 23. As FIG. 3b shows, a front plate 29 (holding element) made of metal is adhesively bonded or welded to the surface of the sheet metal tray element 23a remote from the intake roll 22. The front plate 29 has a through-opening having an internal thread which is engaged by the external thread of a fixing screw 20. The fixing screw 30 passes through the internal hollow cylinder of a hollow-cylindrical piezo ring sensor 28. In addition, the fixing screw 30 passes through a through-opening in a metal disc 31 which serves as gyrating mass. The piezo ring sensor 28 is supported by one circular end face on the front plate 29 and by its other circular end face on the metal disc 31, in each case in abutting contact. When an electrical voltage is applied to the ring actuator 28, the latter expands and in so doing presses the front plate 29 and the gyrating mass 31 apart and accordingly elongates the fixing screw 30. In the voltage-free state, the actuator 28 and the screw 30 contract again. Rapid repetition of that cycle in succession brings about the desired vibration, caused by the gyrating mass 31 being set in motion. In this case too, frequencies in the range of from 10 to 2000 Hz are possible.

Figure 4:
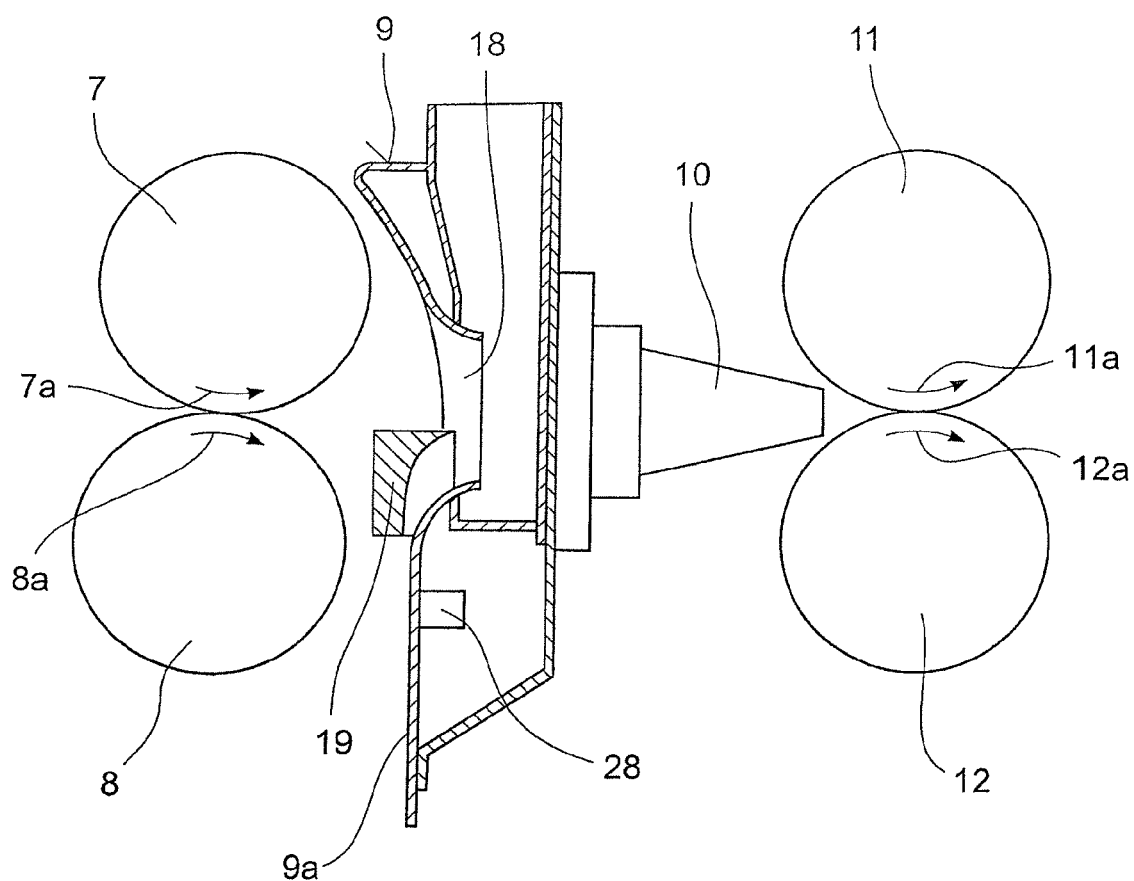
FIG. 4 is a side view, partly in section, of another embodiment of the invention in which the delivery mechanism at the outlet of a carding machine in accordance with FIG. 1 includes a means for generating vibrations assigned to the guide element.

FIG. 4 shows an enlarged view of the delivery mechanism at the outlet of the flat card K in accordance with FIG. 1 incorporating a further illustrative embodiment of the invention. The web guide element 9 has a guide surface 9a which is in the form of a sheet metal element. The guide surface 9a collects the fibre web (not shown) emerging from the nip rolls 7, 8 and guides it through the opening 14 in the direction towards the web funnel 10. Reference numeral 19 denotes a guide body which helps to guide the fibre web into the opening 18. The side of the guide surface 9a remote from the nip rolls 7, 8 is assigned a piezo ring sensor 28, which is of generally similar constriction to the piezo ring sensor 28 described above in connection with FIG. 3a, 3b. As shown in FIG. 4, nip rolls 7, 8 turn in the direction of arrows 7a, 8a, respectively, and delivery rolls 11, 12 turn in the direction of arrows 11a, 12a, respectively.

In other illustrative embodiments, it is possible for an actuator 27 or 28 to be assigned to the sheet metal tray element 2a of the feed table 2 of the flat card K, the actuator co-operating with the feed roll 1. The feed table 2 has a sheet metal tray element 2a (not shown).

The invention has been explained using by way of illustration the example of a flock feeder F for a flat card K and with reference to a flat card K. The device according to the invention is equally suitable for use on all spinning room machines in which a tray-like guide element co-operates with a slowly rotating intake or feed roll, for example opener machines or cleaning machines in spinning room preparation or the intake device upstream of the opening roll of an OE spinning machine.

Although the foregoing invention has been described in detail by way of illustration and example for purposes of understanding, it will be obvious that changes and modifications may be practised within the scope of the appended claims.

What we claim is:

1. A device on a spinning room preparation machine for supplying and/or discharging fibre material, comprising:
    a guide element having a guide surface; and
    at least one conveyor roll located opposite to the guide surface, the conveyor roll adapted to guide the fibre material between the conveyor roll and the guide surface and along the guide surface;
    wherein the device further comprises an actuator adapted to impart vibration of said guide element.

2. A device according to claim 1, wherein said actuator is adapted to impart vibrations to said guide element for effecting a reduction of the frictional resistance between the fibre material and the guide surface.

3. A device according to claim 1, wherein vibrations imparted to said guide element by said actuator enable the fibre material to slide smoothly along the guide surface.

4. A device according to claim 1, wherein the actuator comprises a device for generating vibrations, said vibration-generating device being associated with said guide element for imparting vibrations thereto.

5. A device according to claim 1, wherein the actuator is a piezo actuator.

6. A device according to claim 5, wherein the piezo actuator is a stack actuator.

7. A device according to claim 5, wherein the piezo actuator is a ring actuator.

8. A device according to claim 4, wherein the vibration-generating device is an eccentric device.

9. A device according to claim 4, wherein the vibration-generating device is a shaking device.

10. A device according to claim 1, wherein the actuator is adapted to adjust the vibrational behaviour of the guide surface.

11. A device according to claim 1, comprising a mechanical device for causing vibration of the guide element.

12. A device according to claim 1, comprising an electrical device for causing vibration of the guide element.

13. A device according to claim 1, comprising an electromechanical device for causing vibration of the guide element.

14. A device according to claim 1, wherein the guide element is a part of a fibre flock feeder.

15. A device according to claim 1, wherein the guide element is an intake tray and the conveyor roll is an intake roll.

16. A device according to claim 1, wherein the guide element is an intake tray upstream of an opener roll.

17. A device according to claim 1, wherein the guide element is a feed tray and the conveyor roll is a feed roll at the inlet of a carding machine.

18. A device according to claim 1, wherein the guide element is a component of an arrangement for taking off and condensing a fibre web at the outlet of a carding machine.

19. A fibre opening machine or cleaning machine comprising a device according to claim 1.

* * * * *